(12) United States Patent
Garcia-Osuna et al.

(10) Patent No.: US 8,416,098 B2
(45) Date of Patent: Apr. 9, 2013

(54) ACOUSTIC COMMUNICATION APPARATUS FOR USE WITH DOWNHOLE TOOLS

(75) Inventors: Fernando Garcia-Osuna, Sugar Land, TX (US); Miguel Pabon, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 683 days.

(21) Appl. No.: 12/509,843

(22) Filed: Jul. 27, 2009

(65) Prior Publication Data
US 2011/0018735 A1   Jan. 27, 2011

(51) Int. Cl.
*G01V 3/00* (2006.01)

(52) U.S. Cl.
USPC .................. 340/854.4; 340/854.3; 340/854.6; 340/854.7

(58) Field of Classification Search ............... 340/854.3, 340/854.4, 854.6, 854.7
See application file for complete search history.

(56) References Cited

U.S. PATENT DOCUMENTS

| | | | |
|---|---|---|---|
| 3,252,225 A | 5/1966 | Hixson | |
| 3,448,612 A | 6/1969 | Lebourg | |
| 4,518,888 A * | 5/1985 | Zabcik | 310/334 |
| 5,128,901 A | 7/1992 | Drumheller | |
| 5,222,049 A | 6/1993 | Drumheller | |
| 5,274,606 A * | 12/1993 | Drumheller et al. | 367/82 |
| 5,319,610 A * | 6/1994 | Airhart | 367/82 |
| 5,359,324 A * | 10/1994 | Clark et al. | 340/854.3 |
| 5,477,505 A | 12/1995 | Drumheller | |
| 5,703,836 A | 12/1997 | Drumheller | |
| 5,886,303 A | 3/1999 | Rodney | |
| 5,924,499 A | 7/1999 | Birchak et al. | |
| 6,147,932 A | 11/2000 | Drumheller | |
| 6,272,916 B1 * | 8/2001 | Taniguchi et al. | 73/152.47 |
| 6,641,434 B2 | 11/2003 | Boyle et al. | |
| 6,697,298 B1 | 2/2004 | Dubinsky et al. | |
| 6,791,470 B1 | 9/2004 | Drumheller | |
| 6,837,332 B1 | 1/2005 | Rodney | |
| 6,856,255 B2 * | 2/2005 | Chalitsios et al. | 340/854.4 |
| 6,891,481 B2 | 5/2005 | Dubinsky et al. | |
| 6,909,667 B2 * | 6/2005 | Shah et al. | 367/83 |
| 6,933,856 B2 | 8/2005 | Schultz | |
| 7,132,958 B2 * | 11/2006 | Dodge et al. | 340/854.3 |
| 7,257,489 B2 * | 8/2007 | Hsu et al. | 702/6 |
| 7,324,010 B2 * | 1/2008 | Gardner et al. | 340/854.4 |
| 2003/0137430 A1 * | 7/2003 | Chalitsios et al. | 340/870.01 |
| 2004/0055755 A1 * | 3/2004 | Roesner et al. | 166/382 |
| 2005/0024232 A1 * | 2/2005 | Gardner et al. | 340/854.4 |
| 2007/0247328 A1 * | 10/2007 | Petrovic et al. | 340/853.7 |

FOREIGN PATENT DOCUMENTS

GB    2236782    4/1991

\* cited by examiner

*Primary Examiner* — Jean B Jeanglaude
(74) *Attorney, Agent, or Firm* — Chadwick A. Sullivan

(57) ABSTRACT

Acoustic communication apparatus for use with downhole tools are described. An example acoustic communication apparatus for use in a wellbore includes a first acoustic transducer to generate first acoustic signals. The first acoustic transducer is mounted in an interior of a first drill collar to transmit the first acoustic signals via at least a portion of a body of a drillstring or a mud channel within the drillstring to a second drill collar. Additionally, the example acoustic communication apparatus includes a first receiver mounted to the first drill collar to receive second acoustic signals transmitted from the second drill collar.

18 Claims, 11 Drawing Sheets

ACOUSTIC COMMUNICATION APPARATUS FOR USE WITH DOWNHOLE TOOLS

FIELD OF THE DISCLOSURE

This patent relates generally to downhole communication apparatus and, more particularly, to acoustic communication apparatus for use with downhole tools.

BACKGROUND

During drilling operations (i.e., advancement of a downhole drilling tool), communications between a downhole drilling tool and surface devices may be performed using a telemetry system. In general, such telemetry systems enable the conveyance of power, data, commands and/or any other signals or information between the downhole drilling tool and the surface devices. Thus, these telemetry systems enable data related to the conditions of the wellbore and the downhole drilling tool to be conveyed to the surface devices for processing, display, and analysis. Telemetry systems also enable the operation of the downhole drilling tool to be controlled via commands or other information sent from the surface devices to the downhole drilling tool.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, used as a replacement for, or otherwise combined with other features from other examples.

In some cases, it may be difficult or impractical to pass wires through one or more portions of a drillstring due to the nature and characteristics of one or more components positioned along the drillstring. For example, a mud motor is typically non-wired to the drillstring or other components of the drillstring. Such non-wired drillstring portions do not have electrical conductors or wires to transmit electrical signals such as communication signals, signals from sensors, etc. A bottomhole assembly may be provided with a non-wired component such as a mud motor positioned such that the mud motor prevents near-bit sensors from communicating (e.g., via wires or other electrical conductors) to other components that are located uphole relative to the non-wired component. However, it may be desirable to enable communication along a drillstring between the near-bit sensors and a mud-pulse telemetry system located uphole from the mud motor.

In general, the example acoustic communication apparatus described herein enable, among other uses, bidirectional, wireless communication between portions of a drillstring separated by one or more non-wired drillstring portions. More specifically, the example acoustic communication apparatus described herein enable real-time information to be conveyed via acoustic signals that can travel through or bypass non-wired portions of a drillstring. In one particular example, the acoustic communication apparatus described herein may be used to enable communications between two components of a drillstring that are separated by a non-wired component or otherwise not in wired communication. Among other benefits, the real-time information that can be conveyed using the examples described herein may be utilized to minimize course corrections, improve drilling efficiency, provide real-time formation evaluation and, more generally, to improve downhole operations.

Figure 1:
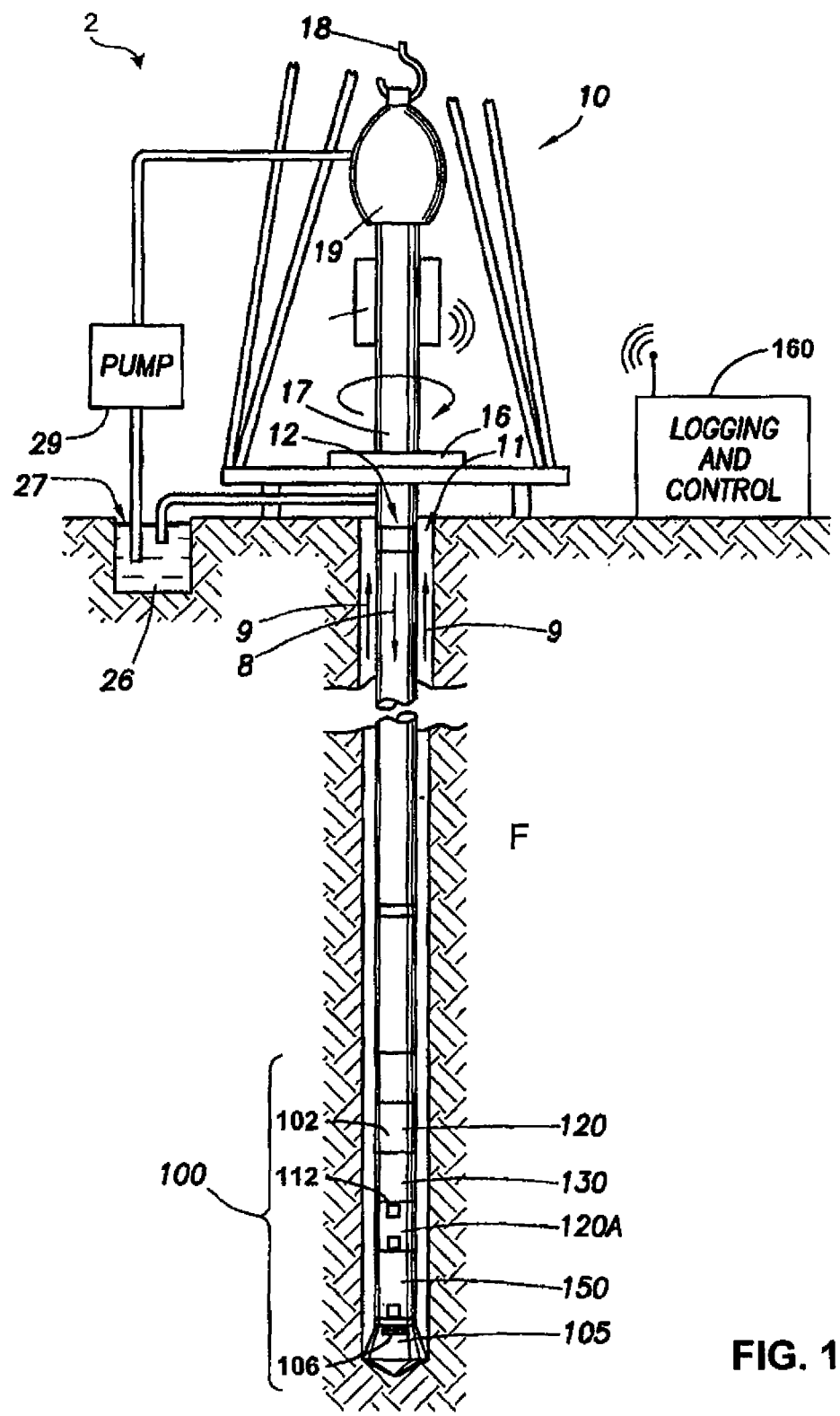
FIG. 1 illustrates an example wellsite drilling system implementing the example acoustic communication apparatus described herein.

FIG. 1 illustrates an example wellsite drilling system 2 that can be employed onshore and/or offshore and which may implement the example acoustic communication apparatus described herein. In the example wellsite system 2 of FIG. 1, a borehole 11 is formed in one or more subsurface formations F by rotary and/or directional drilling. A platform and derrick assembly 10 is positioned over the borehole 11 at the surface. The derrick assembly 10 includes a rotary table 16, which may engage a kelly 17 at an upper end of the drillstring 12 to impart rotation to the drillstring 12. The rotary table 16 may be energized by a device or system not shown. The example drillstring 12 is suspended from a hook 18 that is attached to a traveling block (not shown). Additionally, the drillstring 12 is positioned through the kelly 17 and the rotary swivel 19, which permits rotation of the drillstring 12 relative to the hook 18. Additionally or alternatively, a top drive system (not shown) could be used to impart rotation of the drillstring 12.

In the example depicted in FIG. 1, the surface system further includes drilling fluid 26. For example, the drilling fluid 26 may comprise a water-based mud, an oil-based mud, a gaseous drilling fluid, water, gas or other fluid for maintaining bore pressure and/or removing cuttings from the area surrounding the drill bit 105. The drilling fluid 26 may be stored in a pit 27 formed at the well site. A pump 29 delivers the drilling fluid 26 to the interior of the drillstring 12 via a port in the rotary swivel 19, causing the drilling fluid 26 to flow downwardly through the drillstring 12 as indicated by directional arrow 8. The drilling fluid 26 exits the drillstring 12 via ports in the drill bit 105 and then circulates upwardly through the annulus region between the outside of the drillstring 12 and the wall of the borehole 11 as indicated by directional arrows 9. The drilling fluid 26 lubricates the drill bit 105, carries cuttings from the formation up to the surface as it is returned to the pit 27 for recirculation, and creates a mudcake layer (not shown) (e.g., filter cake) on the walls of the borehole 11.

The example bottomhole assembly 100 of FIG. 1 may include any number of tools or sensors, such as formation evaluation tools, logging tools and/or sampling devices to obtain samples of fluid downhole (e.g., formation fluid or drilling fluid). The tools or sensors of the bottomhole assembly 100 may measure a characteristic of the borehole 11, the formation surrounding the borehole 11, and/or the drillstring 12. For example, the bottom hole assembly 100 may measure and/or analyze pressure, temperature, drilling fluid flow rate, drilling fluid density, drilling fluid viscosity, formation fluid density, resistivity measurement(s), spectral measurement(s), borehole trajectory and/or drillstring and/or drill component location(s) relative to the borehole 11, etc.

In some examples, the tools of the bottomhole assembly 100 of FIG. 1 may include any number and/or type(s) of logging-while-drilling (LWD) modules or tools (two of which are designated by reference numerals 120 and 120A) that may be housed in respective drill collars 102 and 104. The bottomhole assembly 100 may also include measuring-while-drilling (MWD) modules (one of which is designated by reference numeral 130), and another drillstring component 150 such as, a rotary-steerable system or mud motor. The MWD module 130 may measure a characteristic of the drillstring 12, the borehole 11 or the formation surrounding the borehole 11. For example, the MWD module 130 may measure and/or calculate the azimuth and inclination of the drill bit 105 to, for example, monitor the trajectory of the borehole 11. The MWD module 130 may include one or more tools to measure weight-on-bit, torque, vibration, shock, stick slip and/or other characteristics as will be appreciate by a person having ordinary skill in the art.

The bottomhole assembly 100 includes capabilities for measuring, processing and/or storing information, as well as for communicating information via, for example, a telemetry system 112. The telemetry system 112 may be a bi-directional telemetry system for transmitting information and/or data to and from the borehole 11, such as to and from the bottomhole assembly 100. Additionally or alternatively, the telemetry system 112 may include communication modules that enable local communication within the bottomhole assembly 100 to convey data between, for example, sensors 106 proximate the drill bit 105 (e.g., near bit sensors) and other components uphole from the other drillstring component 150. In some examples, portions of the telemetry system 112 may be positioned or embedded within the LWD module 120 and 120A and/or the MWD module 130 to decrease the amount of space consumed by the telemetry system 112 within the bottomhole assembly 100. The telemetry system 112 may be a mud-pulse telemetry system, a wired drill pipe telemetry system, such as the wired drill pipe telemetry system described in U.S. Pat. No. 6,641,434 issued to Boyle et al. and assigned to the assignee of the present invention, an electromagnetic telemetry system, an acoustic telemetry system and/or any combination of these telemetry systems. For example, the telemetry system 112 may comprise wired drill pipe near the Earth's surface and mud-pulse telemetry near the bottomhole assembly 100. In addition, the telemetry system 112 may comprise multiple numbers of one or more types of telemetry systems working in parallel. The present invention should not be deemed as limited to any type or number of telemetry systems. Additionally, different portions of the telemetry system 112 may interface with each other.

The logging and control computer 160 may receive information and/or data transmitted from the telemetry system 112. The logging and control computer 160 may analyze the data and information to, for example, modify the downhole operations such as the trajectory of the borehole 11, the rate of penetration and/or the operation of tools or sensors in the bottomhole assembly 100. The logging and control computer 160 may include a user interface that enables parameters to be input and/or outputs to be displayed. While the logging and control computer 160 is depicted uphole and adjacent the wellsite system, a portion or the entire logging and control computer 160 may be positioned in the drillstring 12, the bottomhole assembly 100 and/or in a remote location.

Although the components of FIG. 1 are shown and described as being implemented in a particular conveyance type, the example methods and apparatus described herein are not limited to a particular conveyance type but, instead, may be implemented in connection with different conveyance types including, for example, coiled tubing, wireline, wired drill pipe, and/or any other conveyance types known in the industry. Additionally or alternatively, the examples described herein may be implemented with smart wells and/or intelligent completions.

Figure 2:
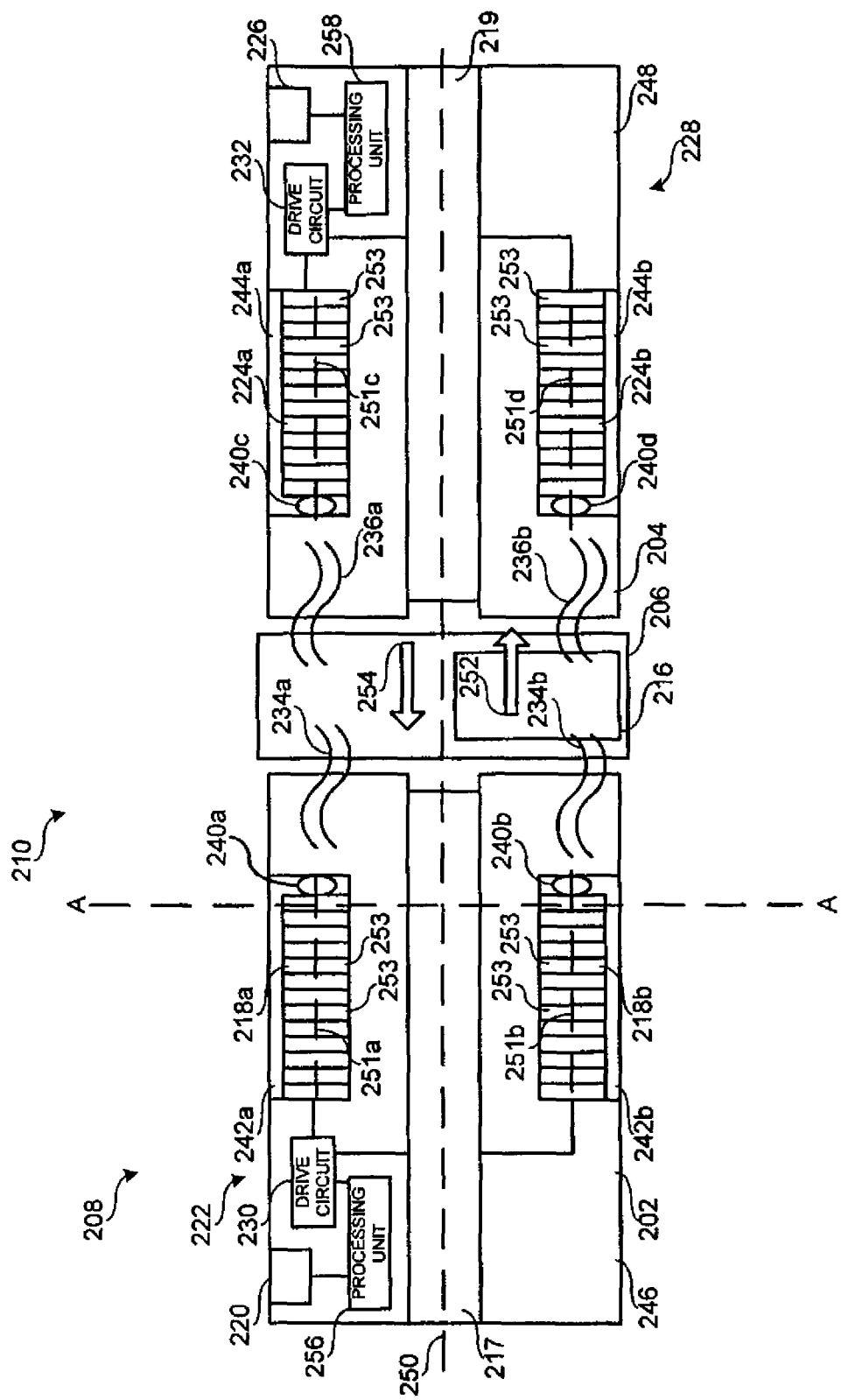
FIG. 2 depicts a portion of an example drillstring including an example acoustic communication apparatus.

FIG. 2 depicts first, second and third drillstring portions 202, 204 and 206 of a drillstring 208 that may be part of a bottomhole assembly 210. The first, second and third drillstring portions 202, 204, and 206 may be tools, sensors, components of the BHA 100 or other wellbore components. The first, second and third drillstring portions 202, 204, and 206 may each consist of a drill collar or sub-drill collar. The third drillstring portion 206 may be a non-wired component such that the third drillstring portion 206 is not in direct electrical connection to the first or second drillstring portions 202, 204. In an embodiment, the third drillstring portion 206 may comprise a motor 216 such as a drill motor or a turbine and/or any other non-wired device(s) for use in a downhole environment. Additionally, the drillstring 208 includes a mud channel 217 extending through the drillstring portions 202, 204 and 206 to convey drilling fluid 219 through the drillstring 208.

To enable acoustic communication between the first drillstring portion 202 and the second drillstring portion 204, the first drillstring portion 202 includes first acoustic transducers 218*a-b* and a first receiver 220 that are part of a first communication module 222. Similarly, the second drillstring portion 204 includes second acoustic transducers 224a-b and a second receiver 226 that are part of a second communication module 228. As described in more detail below, the communication modules 222 and 228 enable wireless acoustic communication through the third drillstring portion 206 and/or any other device(s) positioned between the communication modules 222 and 228. Advantageously, in the case where the third drillstring portion 206 is non-wired, the communication modules 222 and 228 effectively communicatively bypass the third portion 206 by transmitting acoustic signals through the structural or mechanical components of the third drillstring portion 206. As depicted in the embodiment of FIG. 2, the communication modules 222 and 228 include the respective acoustic transducers 218a-b and 224a-b, the respective receivers 220 and 226, the respective drive circuits 230 and 232, and the respective processing units 256 and 258. However, more generally, a communication module, such as those described herein, may include fewer or more components than depicted in the example of FIG. 2 and/or any other combination of components to enable acoustic communications via a drillstring or the like. For example, a communication module may, in some embodiments, include only an acoustic transducer and a receiver.

The acoustic transducers 218 and 224 may be positioned within or inside the drillstring 208 to prevent the acoustic transducers 218 and 224 from exposure to drilling fluid or formation fluid. In other words, each of the acoustic transducers 218 and 224 is mounted in an interior (i.e., entirely inside or within an inner diameter) of a respective one of the drillstring portions 202 and 204. The acoustic transducers 218 and 224 may be implemented using piezoelectric actuators, a stack of piezoelectric elements, one or more multilayer piezoelectric elements, magnetostrictive elements or any combination of the foregoing. Piezoelectric actuators consume relatively small amounts of power in operation, are relatively inexpensive and are relatively small. Each of the receivers 220 and 226 may be implemented using an accelerometer, a triaxial accelerometer, a piezoelectric sensor or any combination thereof.

To generate acoustic signals having a frequency of between about one hundred hertz and thirty kilohertz, or any other suitable frequency, each of the acoustic transducers 218 and 224 are communicatively coupled (e.g., via bulkhead connectors) to respective first and second drive circuits 230 and 232. The acoustic transducers 218 and 224 receive drive signals (e.g., varying voltage signals, varying current signals) from the drive circuits 230 and 232. These drive signals may cause the acoustic transducers 218 and 224 to elongate, contract or otherwise distort to generate mechanical energy. In turn, the mechanical energy generated by the first acoustic transducers 218 may be imparted to the first drillstring portion 202. Similarly, the mechanical energy generated by the second acoustic transducers 224 may be imparted to the second drillstring portion 204. The mechanical energy imparted to the first and second drillstring potions 202 and 204 may generate first and second acoustic signals 234a-b and 236a-b that are transmitted via the drillstring portions 202 and 204. The acoustic signals 234a-b and 236a-b may take the form of longitudinal waves, shear waves, flexural waves, sound waves, compressional elastic waves (i.e., P-waves), or other waves or signals as will be appreciated by a person having ordinary skill in the art.

In one example, the mechanical energy generated by the acoustic transducers 218 and 224 excites longitudinal waves and/or shear waves in the first and second drillstring portions 202 and 204 such that the first acoustic signals 234 travel through the third drillstring portion 206 toward the second receiver 226 and the second acoustic signals 236 travel through the third drillstring portion 206 toward the first receiver 220. At low frequencies, the acoustic signals 234 and 236 may have relatively long wavelengths relative to the lateral dimensions of the first and second drillstring portions 202 and 204. As a result, the longitudinal and/or shear waves may travel at relatively constant velocity and may not be significantly affected by dispersion. Thus, among other uses, the acoustic signals 234a-b and 236a-b are particularly well suited for carrying data or information in wireless telemetry applications.

To enable a majority of the mechanical energy produced by the acoustic transducers 218 and 224 to be used to generate and transmit the acoustic signals 234 and 236, the acoustic transducers 218 and 224 may be mounted to the drillstring portions 202 and 204 via ball tips 240a-d. The ball tips 240 may also facilitate alignment of the acoustic transducers 218 and 224. Additionally, the ball tips 240 may prevent the acoustic transducers 218 and 224 from being damaged by shearing forces generated during a drilling operation by, for example, decoupling torque and/or off-center forces from the acoustic transducers 218 and 224. However, the acoustic transducers 218 and 224 may be mounted to the drillstring portions 202 and 204 via any other suitable method such as, for example, fasteners or bolts as discussed below. The acoustic transducers 218 and 224 may also be preloaded and/or clamped within first and second chambers 242 and 244 defined by first and second electronic chassis 246 and 248.

Figure 3:
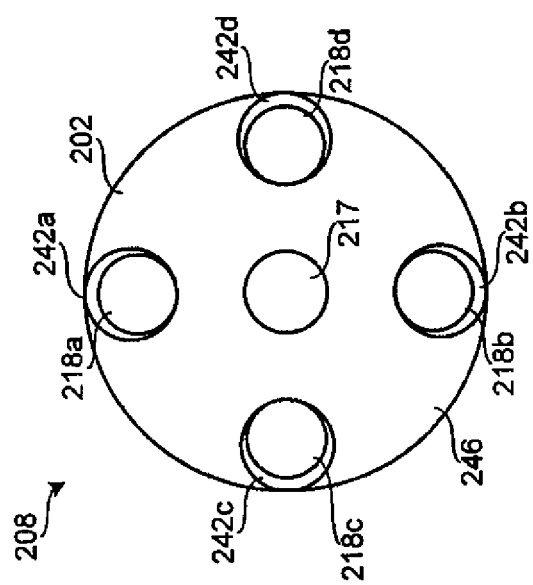
FIG. 3 depicts a cross-sectional view of the portion of the example drillstring of FIG. 2 taken along A-A.

As shown in FIG. 3, the first drillstring portion 202 includes four acoustic transducers 218a-d azimuthally or radially positioned within the first chambers 242a-d. In this example, the transducers 218 are spaced approximately ninety degrees apart relative to a longitudinal axis 250 (FIG. 2) of the drillstring 208. In such an embodiment, the transducers 218a-d may be substantially equidistantly and radially spaced about the drillstring 208. However, the acoustic transducers 218a-d may be unevenly spaced, such as positioned at other radial positions. Similarly, the second drillstring portion 204 includes four acoustic transducers 224 (two of which are depicted at 224a and 224b) azimuthally or radially positioned within the second chambers 244 approximately ninety degrees apart relative to the longitudinal axis 250 of the drillstring 208 and opposite the first acoustic transducers 218.

Turning back to FIG. 2, each of the acoustic transducers 218 and 224 has a longitudinal axis 251a-d that is not coincident with and/or which is offset from the longitudinal axis 250 of the drillstring 208. Specifically, in this example, each of the acoustic transducers 218 and 224 includes a plurality of solid disc-shaped elements 253 (e.g., solid disc-shaped piezoelectric elements) that form a stack such that the longitudinal axis 251 of each stack is substantially parallel to the longitudinal axis 250 of the drillstring 208.

While in this example the first and second drillstring portions 202 and 204 each include four acoustic transducers, the first drillstring portion 202 and/or the second drillstring portion 204 may include any number of acoustic transducers having any other geometry and positioned in any suitable configuration. Further, in examples where the drillstring portions 202 and 204 each include a single acoustic transducer, the single acoustic transducer may be larger than the transducers used in examples where the drillstring portions 202 and 204 include a plurality of acoustic transducers.

In operation, to identify a communication frequency for use by the communication modules 222 and 228, drive signals having different frequencies may be sent to the first and second acoustic transducers 218 and 224. For example, the drive signals may be varied to sweep a band of frequencies (e.g., one hundred hertz to thirty kilohertz or another range of frequencies) to identify a drive signal frequency and, thus, an acoustic signal frequency that is best suited to communicate under the particular operating conditions to which the drillstring 208 is subjected. Once a suitable drive signal frequency is identified, drive signals having the identified frequency are conveyed to the acoustic transducers 218 and 224 to cause the acoustic transducers 218 and 224 to generate the acoustic signals 234 and 236 at the identified frequency. The acoustic signals 234 and 236 may be used to carry or convey information, data and/or commands that correspond to torque, drilling direction, inclination, azimuth or any other suitable information to be communicated between the communication modules 222 and 228.

The acoustic signals 234 and 236 travel in directions generally represented by respective arrows 252 and 254 toward either the first receiver 220 or the second receiver 226. The first receiver 220 receives the acoustic signals 236 generated by the second acoustic transducers 224 and the second receiver 226 receives the acoustic signals 234 generated by the first acoustic transducers 218. The receivers 220 and 226 generate output signals, such as analog or digital signals, that may be bandpass filtered and modified. For example, the output signals may be converted from a first form or type to a second type or form such as conversion from analog to digital form via an analog-to-digital converter positioned in a first or second processing unit 256 or 258. The converted signals may then be further processed and/or communicated to other components, such as other portions of the telemetry system 112 or another component of the drillstring 208. As discussed above, the telemetry system 112 may include a wired drill pipe telemetry system, an electromagnetic telemetry system, an acoustic telemetry system and/or any combination of these telemetry systems.

If desired, the acoustic signals 234 and 236 transmitted via the acoustic transducers 218 and 224 may be controlled to prevent measurement signal contamination with other tools (not shown) in the drillstring 208. For example, the power and/or duration of the signals 234 and 236 may be limited to prevent such signal contamination. More specifically, signals having a higher power level and, thus, typically higher voltages and/or currents, tend to generate larger amounts of radiated and/or conducted energy or noise, which may be received inadvertently by other drillstring components. For example, the performance of additional processing units such as a fluid analysis module may be adversely affected by such radiated and/or conducted energy or noise.

Figure 4:
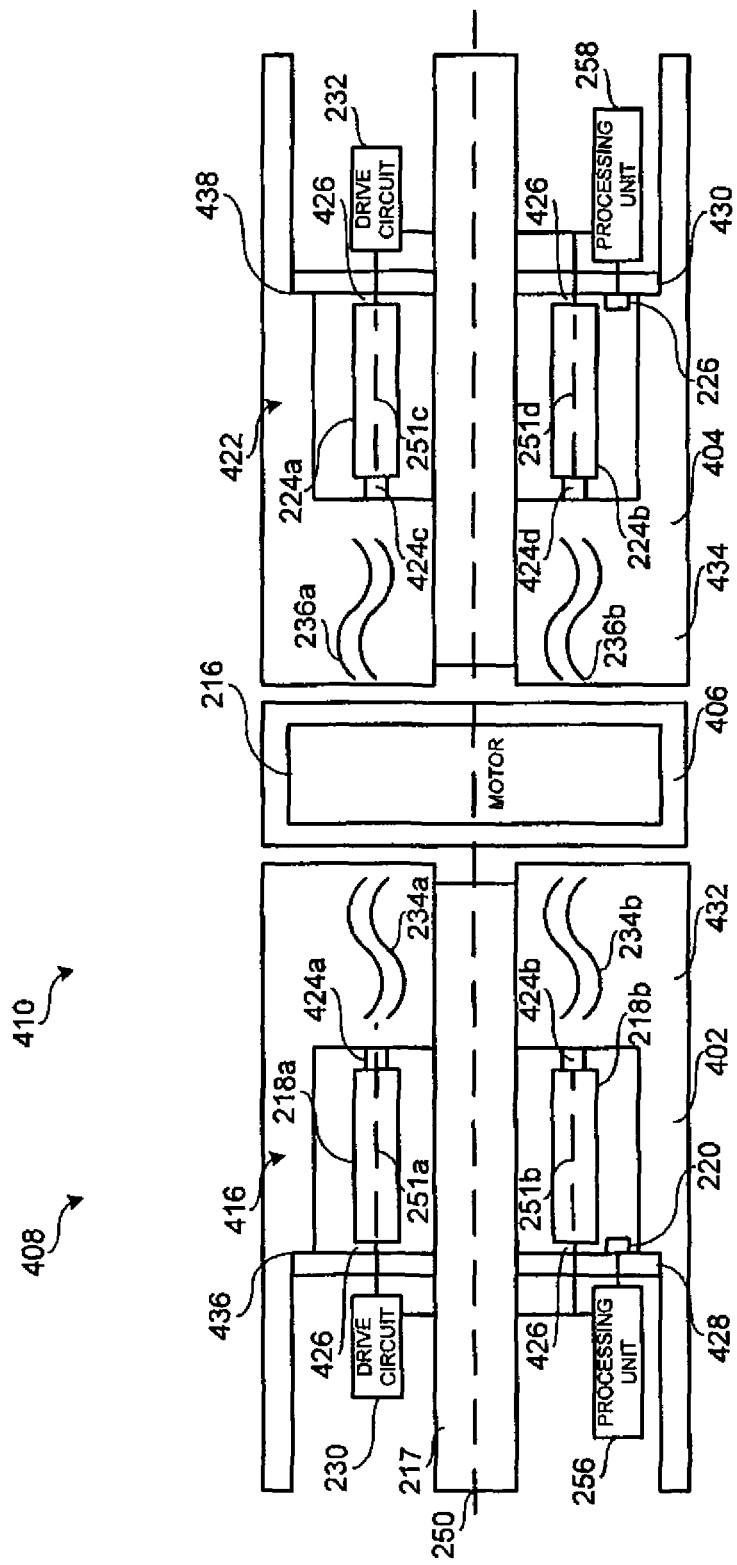
FIG. 4 depicts a portion of another example drillstring including another example acoustic communication apparatus having acoustic transducers that are positioned between respective ends of drill collars and bases mounted within the drill collars.

FIG. 4 depicts first, second and third drillstring portions 402, 404 and 406 of a drillstring and/or toolstring 408. In an embodiment, the first, second and third drillstring portions 402, 404, 406 may be part of a bottomhole assembly 410. To communicate between the first drillstring portion 402 and the second drillstring portion 404, the first drillstring portion 402 includes the first acoustic transducers 218 and the first receiver 220 that are part of a first communication module 416. Similarly, the second drillstring portion 404 includes the second acoustic transducers 224 and the second receiver 226 that are part of a second communication module 422.

In the example of FIG. 4, the acoustic transducers 218 and 224 may be mounted inside (i.e., mounted in an interior of) a respective one of the drillstring portions 402 and 404 via respective fasteners 424*a-d* (e.g., bolts) to provide a space 426 between each of the acoustic transducers 218 and 224 and corresponding first and second plates or bases 428 and 430. Additionally, the first acoustic transducers 218 may be positioned between a first end 432 of the first drillstring portion 402 and the first base 428, and the second acoustic transducers 224 may be positioned between a second end 434 of the second drillstring portion 404 and the second base 430.

The bases 428 and 430 may protect the acoustic transducers 218 and 224 from damage when assembling the mud channel 217 to the drillstring 408. In particular, when the mud channel 217, which may be a separate pipe or sleeve, is inserted in the drillstring assembly 408, the bases 428 and 430 may act as guides to prevent the mud channel 217 from contacting and damaging the acoustic transducers 218 and 224. To mount the bases 428 and 430 to the drillstring portions 402 and 404, the first drillstring portion 402 may define a step or shoulder 436 to be engaged by the first base 428. Similarly, the second drillstring portion 404 may define a step or shoulder 438 to be engaged by the second base 430. In some examples, when assembling the mud channel 217 to the drillstring 408, the mud channel 217 may be torqued to acoustically couple the acoustic transducers 218 and 224 to the respective drillstring portions 402 and 404.

Figure 5:
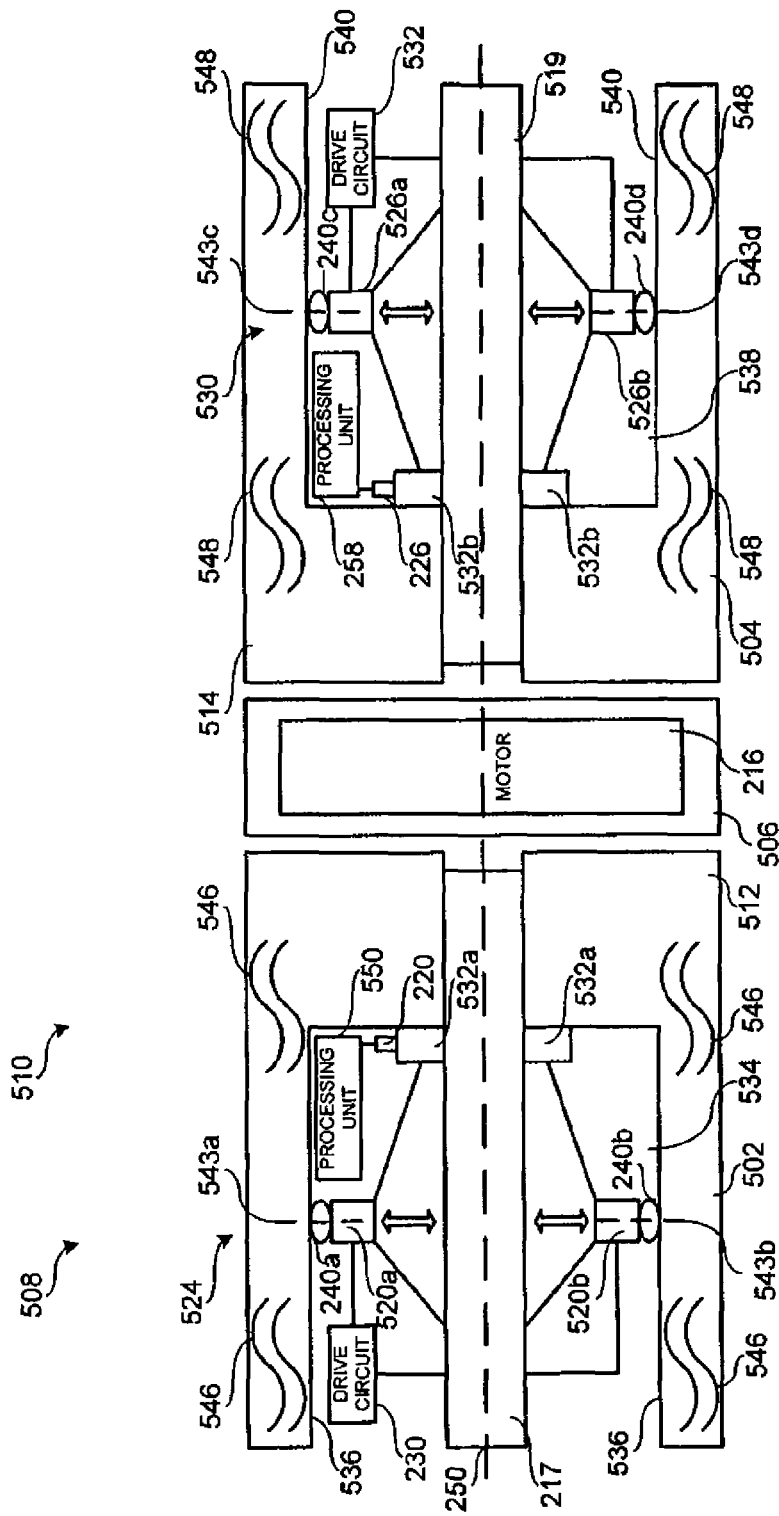
FIG. 5 depicts a portion of another example drillstring including another example acoustic communication apparatus having acoustic transducers mounted to sliding bases.

FIG. 5 depicts first, second and third drillstring portions 502, 504 and 506 of a drillstring and/or toolstring 508 that may be part of a bottomhole assembly 510. Specifically, the first drillstring portion 502 may include a first drill collar or sub-drill collar 512, the second drillstring portion 504 may include a second drill collar or sub-drill collar 514 and the third drillstring portion 506 may include the motor 216.

To communicate between the first drillstring portion 502 and the second drillstring portion 504, the first drillstring portion 502 includes first acoustic transducers 520*a-b* and the first receiver 220 that are part of a first communication module 524. The second drillstring portion 504 includes second acoustic transducers 526*a-b* and the second receiver 226 that are part of a second communication module 530. The acoustic transducers 520 and 526 may be implemented using devices or structures similar or identical to those described above in connection with FIG. 2. However, the geometry of the acoustic transducers 520 and 526 may be adapted to enable the mounting configuration depicted in FIG. 5.

In contrast to the examples described above, the acoustic transducers 520 and 526 are coupled to respective sliding bases 532*a-b* (e.g., spring-loaded mechanisms) that mechanically couple the acoustic transducers 520 and 526 to the drillstring portions 502 or 504 as the mud channel 217 is assembled to the drillstring 508. More specifically, as a first electronic chassis 534 is loaded into the first drill collar 512, the sliding base 532*a* moves the first acoustic transducers 520 toward and into engagement with an inner surface 536 of the first drillstring portion 502. Similarly, as a second electronic chassis 538 is loaded into the second drill collar 514, the sliding base 532*b* moves the second acoustic transducers 526 toward and into engagement with an inner surface 540 of the second drillstring portion 504.

In other examples, the acoustic transducers 520 and 526 may be coupled to the drillstring portions 502 and 504. The acoustic transducers 520 and 526 may be coupled in such a way that the acoustic transducers 520 and 526 are movable with respect the inner surfaces 536 and 540. For example, an adjustment screw or other fastener may be turned or otherwise engaged to move the acoustic transducers 520 and 526 toward and into engagement with the inner surfaces 536 and 540 as the electronic chassis 534 and 538 are loaded into the drill collars 512 and 514.

As depicted in FIG. 5, the acoustic transducers 520 and 526 each have a longitudinal axis 543*a-d* that is not coincident with and/or which is offset from a longitudinal axis 545 of the drillstring 508. Specifically, the longitudinal axis 543 of each of the acoustic transducers 520 and 526 is substantially perpendicular to the longitudinal axis 545 of the drillstring 508.

The drillstring portions 502 and 504 may each include four or any other number of acoustic transducers 520 and 526.

To generate acoustic signals, the acoustic transducers 520 and 526 are coupled to respective ones of the first and second drive circuits 230 and 232. The mechanical energy generated by the acoustic transducers 520 and 526 is imparted to the drillstring portions 502 and 504 via the inner surfaces 536 and 540 to create first and second acoustic signals 546 and 548, which are transmitted via the drillstring portions 502 and 504.

The arrangement of the first acoustic transducers 520 relative to the inner surface 536 may enable a portion of the first acoustic signals 546 to propagate toward the second drillstring portion 504 and a portion of the first acoustic signals 546 to propagate away from the second drillstring portion 504. Similarly, the arrangement of the second acoustic transducers 526 relative to the inner surface 540 may permit a portion of the second acoustic signals 548 to propagate toward the first drillstring portion 502 and of the second acoustic signals 548 to propagate away from the first drillstring portion 502.

Figure 6:
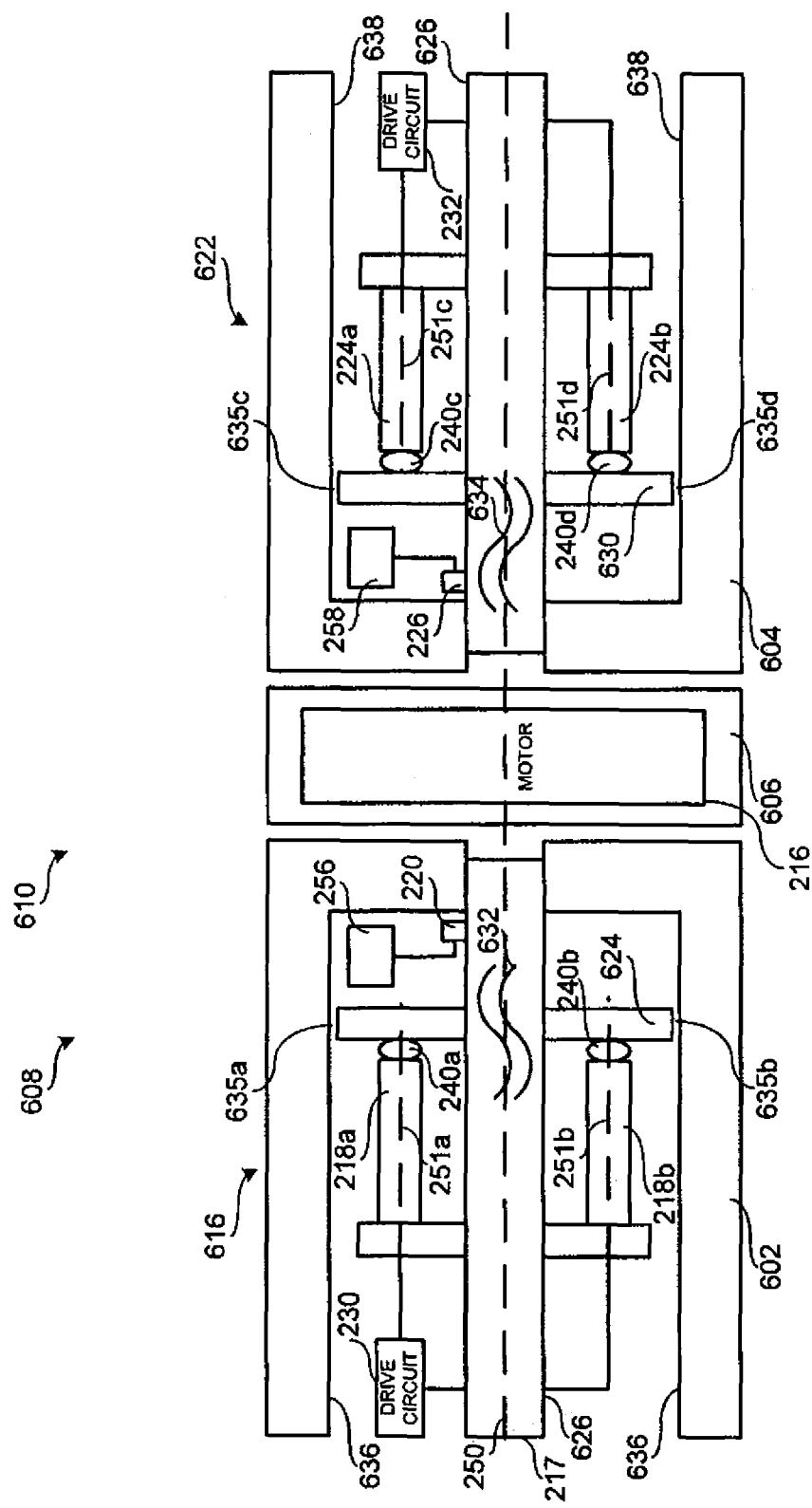
FIG. 6 depicts a portion of another example drillstring including another example acoustic communication apparatus having acoustic transducers mounted to respective bases that at least partially surround a mud channel extending through the drillstring.

FIG. 6 depicts first, second and third drillstring portions 602, 604 and 606 of a drillstring 608 that may be part of a bottomhole assembly 610. To communicate between the first drillstring portion 602 and the second drillstring portion 604, the first drillstring portion 602 includes the first acoustic transducers 218 and the first receiver 220 that are part of a first communication module 616. Similarly, the second drillstring portion 604 includes the second acoustic transducers 224 and the second receiver 226 that are part of a second communication module 622.

In contrast to the examples described above, the first acoustic transducers 218 are mounted to a first base 624 fixed to an outer surface 626 of the mud channel 217. Opposite the first acoustic transducers 218, the second acoustic transducers 224 are mounted to a second base 630 fixed to the outer surface 626 of the mud channel 217. The interaction between the acoustic transducers 218 and 224 and their respective bases 624 and 630 produces acoustic signals in the form of tube waves 632 and 634 that propagate through the mud channel 217 and which are received by the receivers 220 and 226. In this example, the receivers 220 and 226 are acoustically coupled to the mud channel 217. In an embodiment, the tube waves 632 and 634 may have a frequency of approximately less than ten kilohertz and may be narrow band pure-tone pulses. However, tube waves having other frequencies and temporal characteristics may be used instead.

To enable a majority of the mechanical energy produced by the acoustic transducers 218 and 224 to be transferred to the outer surface 626 of the mud channel 217 and, thus, to be utilized to transmit the tube waves 632 and 634 through the mud channel 217, spaces or gaps 635a-d may be provided between the bases 624 and 630 and adjacent surfaces 636 and 638. The spaces or gaps 635 prevent the mechanical energy generated by the transducers 218 and 224 from acting against the surfaces 636 and 638 of the drillstring portions 602 and 604. The acoustic transducers 218 and 224 are coupled to their respective bases 624 and 630 via the ball tips 240 to enable proper alignment of the acoustic transducers 218 and 224 relative to the bases 624 and 630. The drillstring portions 602 and 604 may each include four or any other number of acoustic transducers 218 and 224.

Figure 7:
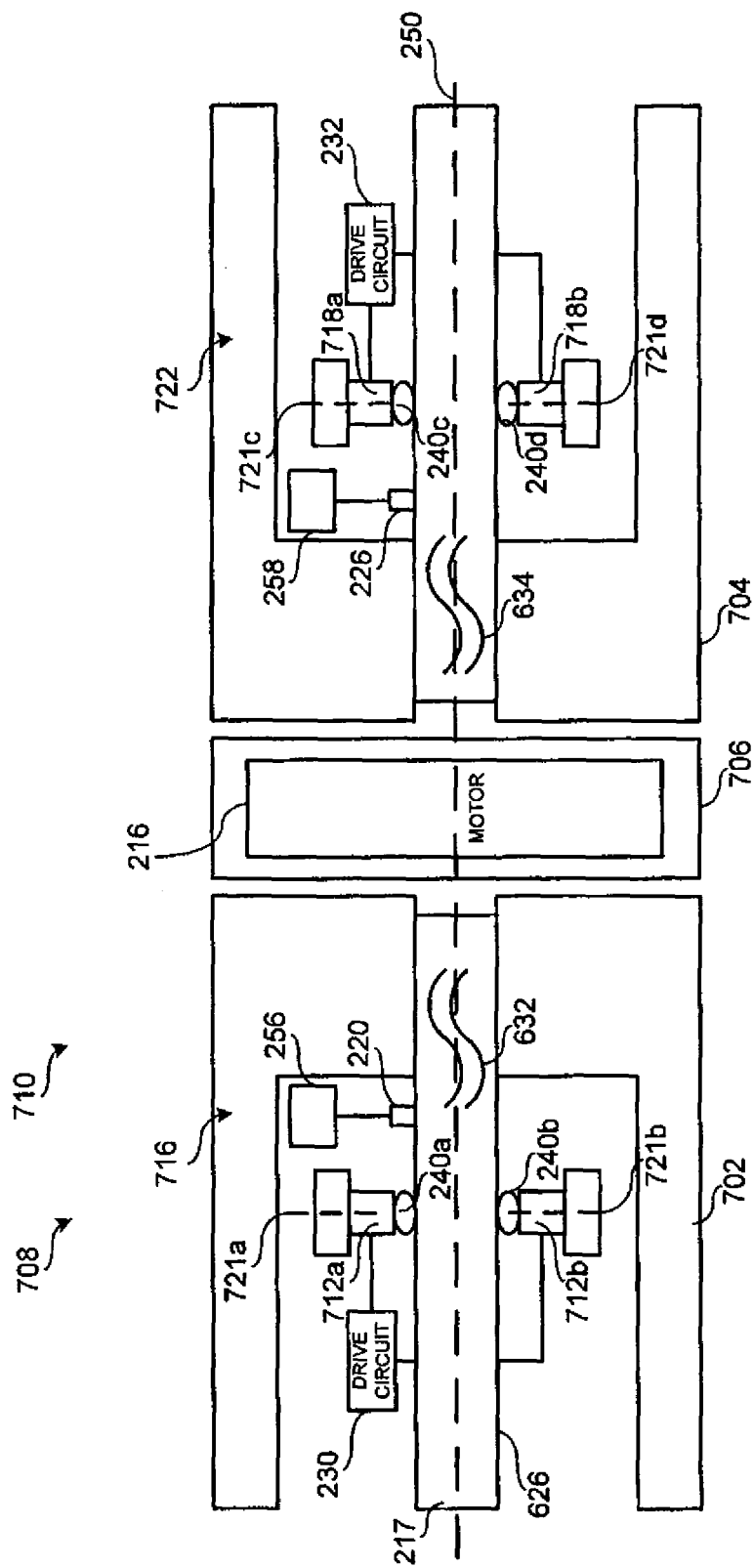
FIG. 7 depicts a portion of another example drillstring including another example acoustic communication apparatus having acoustic transducers mounted to a mud channel extending through the drillstring.

FIG. 7 depicts first, second and third drillstring portions 702, 704 and 706 of a drillstring 708 that may be part of a bottomhole assembly 710. To communicate between the first drillstring portion 702 and the second drillstring portion 704, the first drillstring portion 702 includes first acoustic transducers 712a-b and the first receiver 220 that are part of a first communication module 716. Similarly, the second drillstring portion 704 includes second acoustic transducers 718a-b and the second receiver 226 that are part of a second communication module 722. As depicted in FIG. 7, the acoustic transducers 712 and 718 each have a longitudinal axis 721a-d that is not coincident with and/or which is offset from the longitudinal axis 250 of the drillstring 708. Specifically, the longitudinal axis 721 of each of the acoustic transducers 712 and 718 is substantially perpendicular to the longitudinal axis 250 of the drillstring 708.

In contrast to the example described in connection with FIG. 6, the acoustic transducers 712 and 718 of FIG. 7 are coupled directly to the outer surface 626 of the mud channel 217 via the ball tips 240. This configuration eliminates the need for the bases 624 and 630 of FIG. 6 while still enabling the acoustic transducers 712 and 718 to generate the tube waves 632 and 634. Thus, the example acoustic communication apparatus depicted in FIG. 7 may be more compact or smaller than the example depicted in FIG. 6. In operation, the acoustic transducers 712 and 718 may be excited using in-phase via drive signals.

The drillstring portions 702 and 704 may each include two acoustic transducers 712 and 718 azimuthally or radially positioned relative to the longitudinal axis 723 of the drillstring 708. However, the drillstring portions 702 and 704 may include any number of acoustic transducers positioned in any suitable arrangement.

Figure 8:
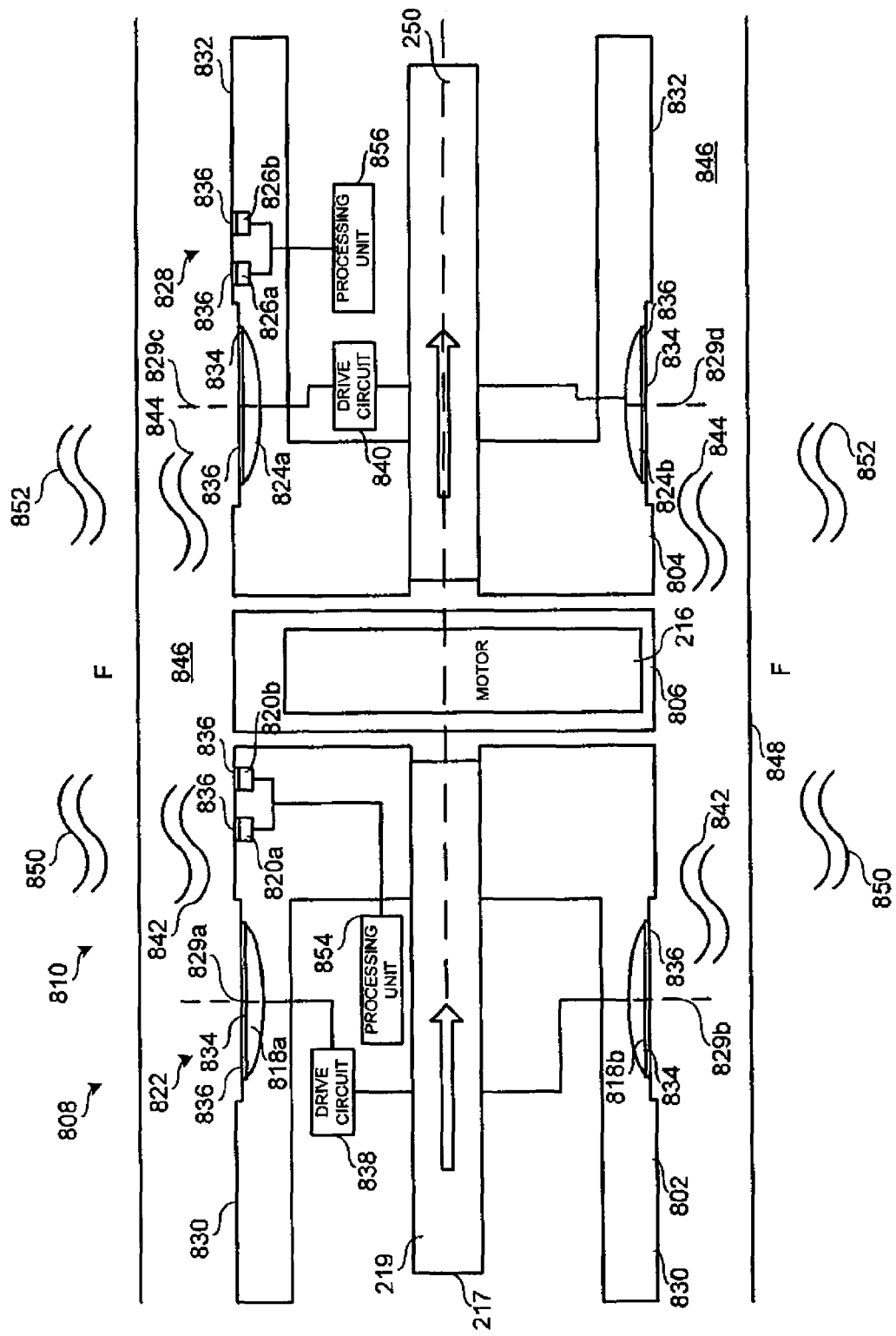
FIG. 8 depicts a portion of another example drillstring including another example acoustic communication apparatus having acoustic transducers mounted to exterior surfaces of respective drill collars.

FIG. 8 depicts first, second and third drillstring portions 802, 804 and 806 of a drillstring 808 that may be part of a bottomhole assembly 810. Specifically, the first drillstring portion 802 may be a first drill collar or sub-drill collar, the second drillstring portion 804 may be a second drill collar or sub-drill collar and the third drillstring portion 806 may include the motor 216.

To communicate between the first drillstring portion 802 and the second drillstring portion 804, the first drillstring portion 802 includes a plurality of first acoustic transducers 818a-b and a plurality of first receivers 820a-b that are part of a first communication module 822. Similarly, the second drillstring portion 804 includes a plurality of second acoustic transducers 824a-b and a plurality of second receivers 826a-b that are part of a second communication module 828. In contrast to the examples described above, each of the first acoustic transducers 818 is coupled to an outer surface 830 of the first drillstring portion 802 and each of the second acoustic transducers 824 is coupled to an outer surface 832 of the second drillstring portion 804.

The acoustic transducers 818 and 824 each have an axis 829a-d that is not coincident with and/or that is offset from the longitudinal axis 250 of the drillstring 808. Specifically, the axis 829 of each of the acoustic transducers 818 and 824 is substantially perpendicular to the longitudinal axis 250 of the drillstring 808. Additionally, each of the acoustic transducers 818 and 824 may include a cylindrically-shaped surface 834 adjacent a respective one of the outer surfaces 830 and 832. In some examples, the acoustic transducers 818 and 824 may operate at relatively low frequencies and in a non-resonant mode. Further, the acoustic transducers 818 and 824 may be implemented using piezoelectric actuators, rubber molded low-frequency sonic transmitters, omnidirectional piezoelectric actuators, rubber-molded piezoelectric transmitters, a piezoelectric element, magnetostrictive elements, a monopole transmitter, or any combination thereof. The receivers 820 may be implemented using a plurality of hydrophones, a pair of piezoelectric sensors, or any combination of the foregoing.

Each of the plurality of first receivers 820 is coupled to the outer surface 830 of the first drillstring portion 802, and each of the plurality of second receivers 826 is coupled to the outer surface 832 of the second drillstring portion 804. In an embodiment, the first acoustic transducers 818 may be positioned approximately one foot from and/or proximate to at least one of the plurality of first receivers 820, which may be spaced apart from each other approximately four inches. Similarly, the second acoustic transducers 824 may be positioned approximately one foot from and/or proximate to at least one of the plurality of second receivers 826, which may also be spaced approximately four inches apart. To protect the acoustic transducers 818 and 824 and/or the receivers 820 and 826 from being damaged during drilling operations, the acoustic transducers 818 and 824 and the receivers 820 and 826 may be provided with a protective material 836 such as, for example, a metallic shield adjacent the outer surface 830 or 832.

The acoustic transducers 818 and 824 may be communicatively coupled to respective first and second drive circuits 838 and 840. The acoustic transducers 818 and 824 may receive drive signals from the drive circuits 838 and 840, which causes the acoustic transducers 818 and 824 to radiate acoustic energy in an omnidirectional manner. This radiated acoustic energy excites tube waves 842 and 844 within an annulus 846 of a borehole 848 and acoustic signals 850 and 852 within the formation F. In an embodiment, the drive signals applied to the acoustic transducers 818 and 824 are controlled such that the signals 842, 844, 850 and 852 are relatively short in duration and/or limited in power to reduce contamination with acoustic measurements in the bottomhole assembly 810.

At least a portion of the tube waves 842 and 844 and the signals 850 and 852 travel toward either the plurality of first receivers 820 or the plurality of second receivers 826. As the receivers 820 and 826 receive the corresponding tube waves 842 and 844 and the signals 850 and 852, the corresponding receiver generates output signals that may be further processed in a first or second processing unit 854 or 856. The converted signals may then be communicated to other components, such as other portions of the telemetry system 112 or another component of the drill string 808. As discussed above, the telemetry system 112 may include a wired drill pipe telemetry system, an electromagnetic telemetry system, an acoustic telemetry system and/or any combination of these telemetry systems.

FIGS. 9-16 are graphs 900, 1000, 1100, 1200, 1300, 1400, 1500 and 1600 that depict results utilizing examples similar to the example apparatus depicted in FIG. 7. Specifically, a single piezoelectric actuator was mounted approximately perpendicular to an outer surface of a mud channel. Opposite the piezoelectric actuator, a triaxial ICP accelerometer was coupled to the outer surface of the mud channel approximately ten feet from the piezoelectric actuator. The accelerometer was positioned such that the z-axis of the accelerometer was in phase with an excitation axis of the piezoelectric actuator, the y-axis of the accelerometer was in-line with but approximately perpendicular to the excitation axis of the piezoelectric actuator and the x-axis of the accelerometer was lateral and approximately perpendicular to the excitation axis of the piezoelectric actuator.

FIGS. 9-12 depict results obtained for an excitation frequency of approximately eight kilohertz for ten cycles, and FIGS. 13-16 depict results obtained for an excitation frequency of approximately thirteen kilohertz for ten cycles. Utilizing a frequency of eight kilohertz or thirteen kilohertz, particle motion may be in-phase with the excitation axis.

Figure 9:
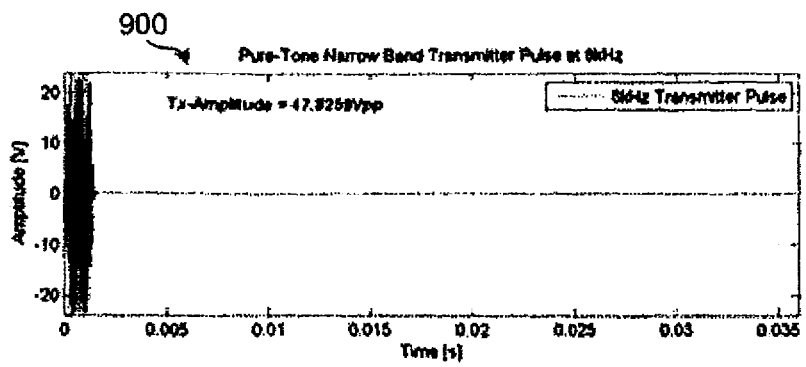
FIG. 9 depicts a graph of time domain amplitude characteristics of an acoustic transducer output signal in response to a pulsed eight kilohertz pure tone signal.
Figure 10:
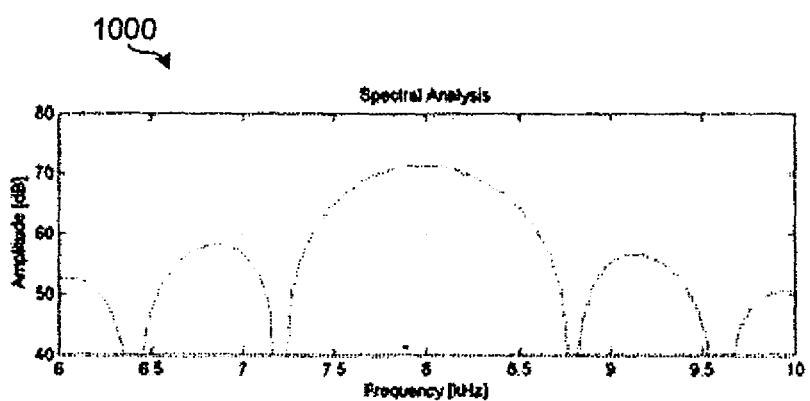
FIG. 10 depicts a graph of the spectral characteristics of the acoustic transducer output signal of FIG. 9.
Figure 11:
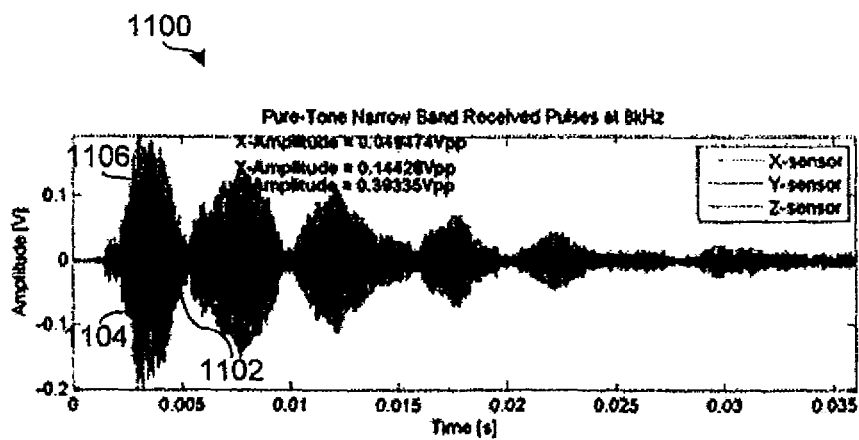
FIG. 11 depicts a graph of the time domain amplitude characteristics of the acoustic pulses of FIG. 9 as received by a receiver on a portion of a drillstring.
Figure 12:
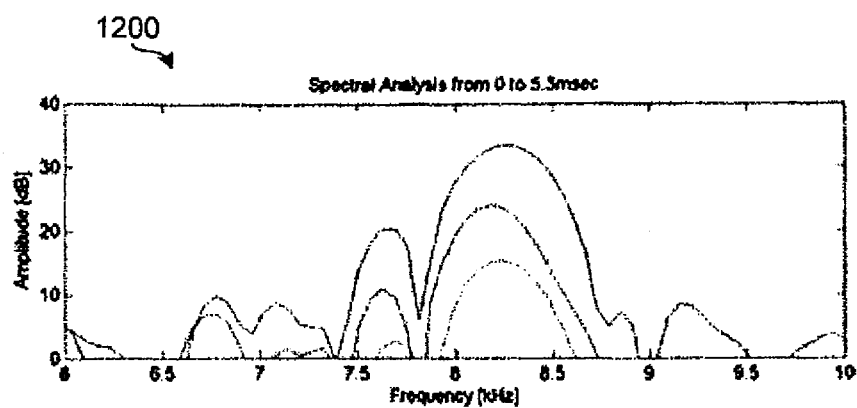
FIG. 12 depicts a graph of the spectral characteristics of the received acoustic pulses of FIG. 11.
Figure 13:
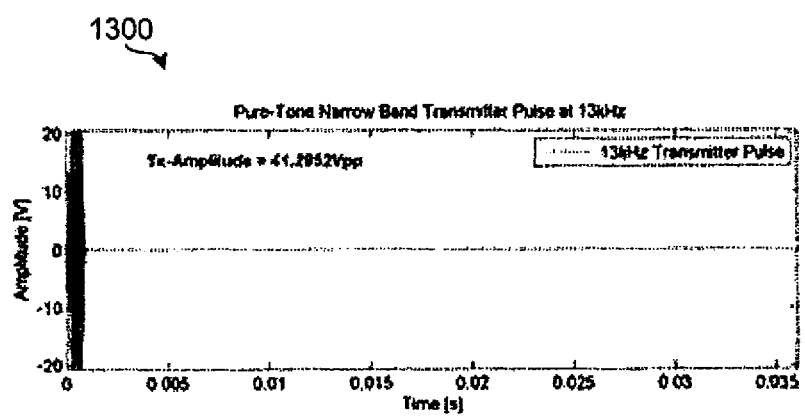
FIG. 13 depicts a graph of the time domain amplitude characteristics of an acoustic transducer output signal in response to a pulsed thirteen kilohertz pure tone signal.
Figure 14:
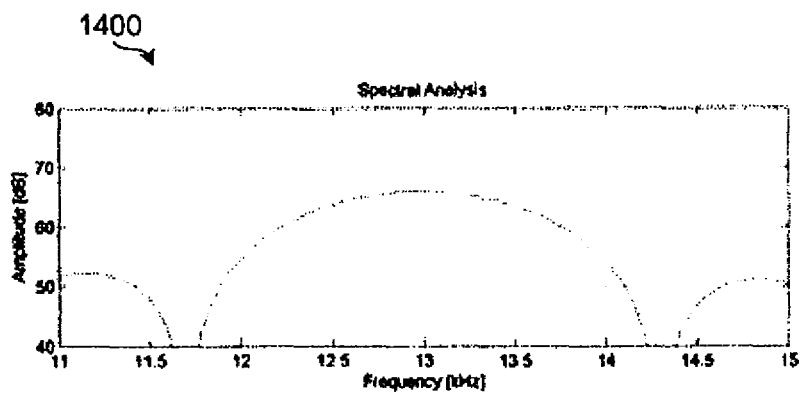
FIG. 14 depicts a graph of the spectral characteristics of the acoustic transducer output signal of FIG. 13.
Figure 15:
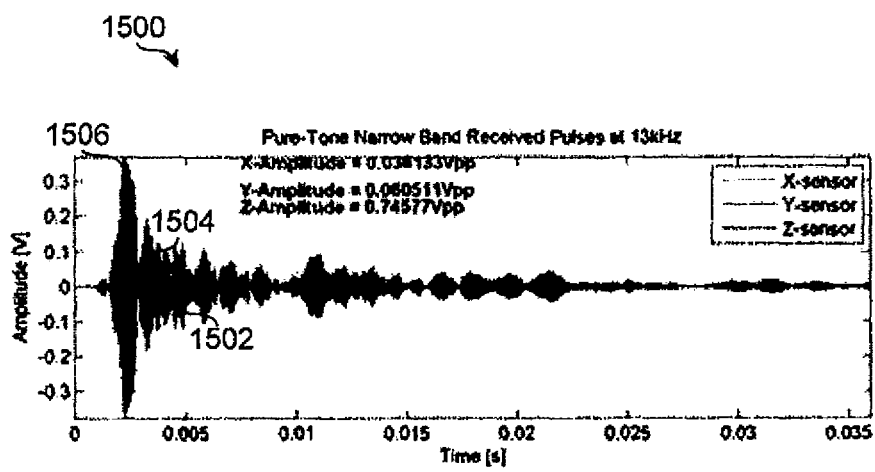
FIG. 15 depicts a graph of the time domain amplitude characteristics of the acoustic pulses of FIG. 13 as received by a receiver on a portion of a drillstring.
Figure 16:
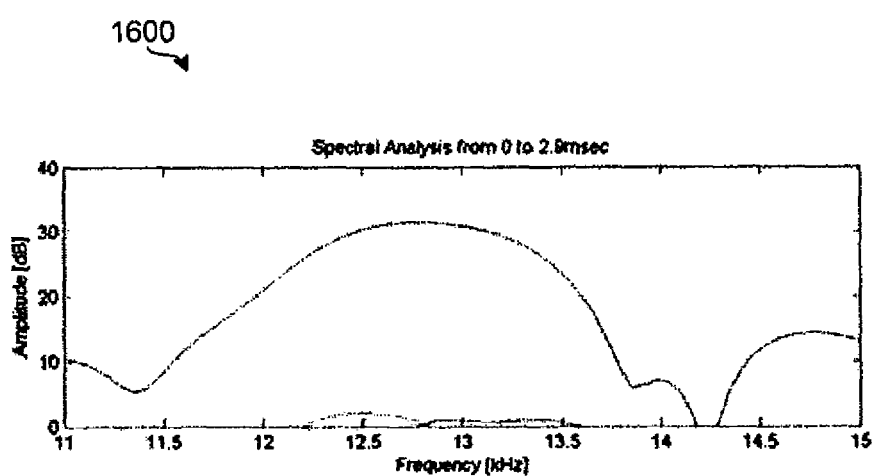
FIG. 16 depicts a graph of the spectral characteristics of the received acoustic pulses of FIG. 15.

FIGS. 9 and 10 correspond to measurements obtained from the piezoelectric actuator where the graph 900 represents amplitude in time domain and the graph 1000 represents spectral amplitude. FIGS. 11 and 12 correspond to measurements obtained from the accelerometer where the graph 1100 represents signal amplitude in time domain and the graph 1200 represents spectral amplitude. Similarly, FIGS. 13 and 14 correspond to measurements obtained from the piezoelectric actuator where the graph 1300 represents amplitude in time domain and the graph 1400 represents spectral amplitude. FIGS. 15 and 16 correspond to measurements obtained from the accelerometer where the graph 1500 represents amplitude in time domain and the graph 1600 represents spectral amplitude.

A comparison between the graphs 1100 and 1500 illustrates that an acoustic signal having a frequency of thirteen kilohertz may be well suited to enable communication between communication modules under at least some operating conditions. In particular, the graph 1500 better matches or correlates to the graph 1400, which illustrates measurements obtained from the piezoelectric actuator in the frequency spectrum. Generally, as depicted in the graph 1100, reverberation is relatively larger at a frequency of eight kilohertz as compared to the reverberation at a frequency of thirteen kilohertz, as depicted in the graph 1500. However, the main pulse is clean from the reverberation pulses, which could be eliminated using a windowing function. Additionally, FIGS. 11 and 15 depict that shear waves may have a larger amplitude than compressional waves. FIGS. 11 and 15 also illustrate that the mode conversion of the x-axis 1102 and 1502 and the y-axis 1104 and 1504 are relatively small compared to the z-axis 1106 and 1506.

The example acoustic communication apparatus described herein enable bidirectional communication of information or data in a drillstring such as, for example, between different portions of a drillstring via acoustic signals. Advantageously, the portions of the drillstring between which communications are conveyed may be separated by, for example, a motor, a packer, one or more LWD or MWD devices or any other component(s) of the drillstring.

The examples described herein may use one or more piezoelectric actuators that may be mounted inside a drillstring such that the longitudinal axes of the actuators are offset relative to a longitudinal axis of the drillstring. In operation, the piezoelectric actuators may receive an electrical signal that causes the piezoelectric actuators to distort and impart mechanical energy to a portion of a drillstring. The energy imparted to the portion of the drillstring may take the form of acoustic signals such as shear waves, longitudinal waves, flexural and/or tube waves. Advantageously, such a configuration dramatically increases the robustness and useful life of the example acoustic communication apparatus described herein, particularly under downhole environmental conditions. Additionally, such a configuration may be used to provide a relatively small, low cost, and low power wireless telemetry system for use in downhole environments.

In some examples, the piezoelectric actuators may be mounted inside a drill collar (e.g., a sub-drill collar) of a drillstring such that the acoustic signals generated by the piezoelectric actuators are transmitted through the drill collar. Additionally, to further protect the piezoelectric actuators while assembling a mud channel to the drillstring, the piezoelectric actuators may be positioned between a base mounted in the drill collar and an end of the drill collar.

In other examples, the piezoelectric actuators may be coupled to an outer surface of a mud channel that extends through the drillstring such that the piezoelectric actuators generate tube waves that propagate through the mud channel. Alternatively, in some examples, the piezoelectric actuators may be coupled to a base that is fixed to an outer surface of the mud channel, similarly enabling the piezoelectric actuators to cause tube waves to propagate via the mud channel.

As described herein, the piezoelectric actuators may additionally or alternatively be coupled to a sliding base positioned inside the drillstring that moves the piezoelectric actuators toward a surface of the drillstring as a mud channel is assembled to the drillstring. Alternatively, the piezoelectric actuators may be coupled to the surface of the drillstring. In still other examples, acoustic signals may be generated by one or more piezoelectric actuators coupled to an outer surface of the drillstring to radiate acoustic signals omnidirectionally.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An acoustic communication apparatus for use in a wellbore, the apparatus comprising:
    a first acoustic transducer to generate a first acoustic signal, wherein the first acoustic transducer is mounted in an interior of a first drill collar to transmit the first acoustic signal via at least a portion of a body of a drillstring or a mud channel within the drillstring to a second drill collar; and
    a first receiver mounted to the first drill collar to receive a second acoustic signal transmitted from the second drill collar, wherein the first acoustic transducer comprises a plurality of solid disc-shaped piezoelectric elements forming a stack having a longitudinal axis.

2. The acoustic communication apparatus of claim 1, wherein the first acoustic signal corresponds to information relating to the wellbore.

3. The acoustic communication apparatus of claim 1, wherein the longitudinal axis of the first acoustic transducer is not parallel with a longitudinal axis of the drillstring.

4. The acoustic communication apparatus of claim 1, wherein the longitudinal axis of the first acoustic transducer is substantially parallel to a longitudinal axis of the drillstring.

5. The acoustic communication apparatus of claim 1, wherein the longitudinal axis of the first acoustic transducer is substantially perpendicular to a longitudinal axis of the drillstring.

6. The acoustic communication apparatus of claim 1, wherein the first acoustic transducer is coupled to a base that is fixed to an outer surface of the mud channel such that the first acoustic signal generated by the first acoustic transducer are tube waves that propagate in the mud channel.

7. The acoustic communication apparatus of claim 1, wherein the first and second drill collars are separated by motor through which the first acoustic signal is transmitted, and wherein the motor is not in direct electrical communication with the first drill collar and the second drill collar.

8. The acoustic communication apparatus of claim 7, wherein the first drill collar includes a mud-pulse telemetry system, the second drill collar includes at least one sensor proximate the drill bit.

9. The acoustic communication apparatus of claim 1, further comprising a second acoustic transducer, wherein the second acoustic transducer is mounted in an interior of the first drill collar to transmit the first acoustic signal via at least the portion of the body of the drillstring or the mud channel within the drillstring to the second drill collar.

10. The acoustic communication apparatus of claim 9, wherein the acoustic transducers are azimuthally spaced about a longitudinal axis of the first drill collar of the drillstring.

11. The acoustic communication apparatus of claim 1, further comprising:
    a second acoustic transducer to generate the second acoustic signal, wherein the second acoustic transducer is mounted in an interior of the second drill collar to transmit the second acoustic signal via at least another portion of the body of the drillstring or the mud channel within the drillstring to the first receiver mounted to the first drill collar; and
    a second receiver mounted to the second drill collar to receive the first acoustic signal transmitted from the first acoustic transducer in the first drill collar.

12. The acoustic communication apparatus of claim 1, wherein the first acoustic transducer is mounted to the first drill collar via a sliding base to acoustically couple the first acoustic transducer to the first drill collar as the mud channel is assembled to the drillstring.

13. The acoustic communication apparatus of claim 1, wherein the acoustic signals comprise at least one of longitudinal, shear, flexural or tube waves.

14. The acoustic communication apparatus of claim 1, wherein the acoustic signals have a frequency of between 100 hertz and 30 kilohertz.

15. An acoustic communication apparatus for use in a wellbore, the apparatus comprising:
    a first acoustic transducer to generate a first acoustic signal, wherein the first acoustic transducer is coupled to a first portion of a drillstring to transmit the first acoustic signal to a second portion of the drillstring and wherein a longitudinal axis of the first acoustic transducer is not parallel with a longitudinal axis of the drillstring; and
    a first receiver mounted to the first portion of the drillstring to receive a second acoustic signal transmitted from the second portion of the drillstring, wherein the first acoustic transducer comprises a plurality of solid disc-shaped piezoelectric elements forming a stack having a longitudinal axis.

16. The acoustic communication apparatus of claim 15, wherein the first acoustic transducer is coupled to an outer surface of the first portion of the drillstring.

17. The acoustic communication apparatus of claim 15, wherein the first acoustic signal radiates omnidirectionally.

18. The acoustic communication apparatus of claim 15, wherein the first acoustic transducer comprises a piezoelectric actuator.

* * * * *